United States Patent

Mori

[11] Patent Number: 5,419,005
[45] Date of Patent: May 30, 1995

[54] AIR WIPER MECHANISM FOR VEHICLE

[76] Inventor: Tokuo Mori, 14-23, Kasuga-cho, Neyagawa city, Osaka, Japan

[21] Appl. No.: 166,361

[22] Filed: Dec. 14, 1993

[51] Int. Cl.⁶ .............................................. B60S 1/54
[52] U.S. Cl. ..................... 15/313; 15/250.01
[58] Field of Search ................ 15/313, 250.01, 250.05

[56] References Cited

U.S. PATENT DOCUMENTS

| | | | |
|---|---|---|---|
| 5,097,563 | 3/1992 | Cowan | 15/313 |
| 5,140,719 | 8/1992 | Cowan | 15/313 |

FOREIGN PATENT DOCUMENTS

| | | | |
|---|---|---|---|
| 2566350 | 12/1985 | France | 15/313 |
| 2338597 | 2/1975 | Germany | 15/313 |
| 57-58027 | 12/1982 | Japan . | |
| 24248 | 1/1990 | Japan | 15/313 |

*Primary Examiner*—Christopher K. Moore

[57] ABSTRACT

An air wiper for a vehicle can provide more effective rain water blowing-off function and prevent a windscreen glass from being blurred due to moisture condensation. The air wiper includes a first air ejection unit (nozzle 14) and a second air ejection unit (nozzle 16). The first ejection unit spouts compressed air upward near windscreen glass 12 and along the outer surface of the windscreen glass to form a first air curtain. The second air ejection unit is arranged so as to oscillate and forms a second air curtain through the oscillating movement, the second air curtain being spaced away from the windscreen glass more than the first air curtain. The second air ejection unit is formed of plural nozzles (16), and divided into two or more nozzle parts to form the second air curtain from two or more small air curtains (102, 104) arranged at different distance from the windshield glass. A warm air supplying device (44) is arranged in front of and near the lower end of the windscreen glass 12 to feed warm air upward along the outer surface of the windscreen glass.

12 Claims, 10 Drawing Sheets

FIG. 12 ial wiper mechanism for vehicle

BACKGROUND OF THE INVENTION

1. Field of the Invention

The present invention relates to an air wiper mechanism, and more particularly to an air wiper mechanism for a vehicle that produces plural air curtains using compressed air blast from an air blast nozzle.

2. Description of the Related Art

Conventionally, mechanical wipers are mounted to clear rain from the windscreen glass of a vehicle. Swinging the mechanical wiper obstructs somewhat the front view from a driver's seat, thus making comfortable driving difficult. The mechanical wiper has a disadvantage that oil film tends to adhere on the outer surface of the windscreen glass. The mechanical wipers have various problems such that it is difficult to wipe the corners of the windscreen glass which remain dirty and are directly exposed to rain water.

Under such a background, the present applicant proposed an improved air wiper. This invention was filed for Utility Model application on Jun. 21, 1977 in the Japan Patent Office and was registered as Registration No. 1501677 on Aug. 10 of 1983.

According to "Air Wiper for Vehicle" disclosed in the Utility Model Registration, an air nozzle is arranged to spout compressed air upward and in front of a windscreen glass to blow away rain water.

The structure is featured in that the air wiper includes a second nozzle group formed of plural nozzles and a second oscillating nozzle. Air ejected from the first nozzle group forms a first air curtain near a windscreen glass and substantially in parallel over the entire surface of the windscreen glass, and air ejected from a second oscillating nozzle forms a second air curtain more ahead of the first air curtain or at a position spaced further away from the windscreen glass. The two layer curtains formed on the front and rear planes can more certainly blow off rain water and provide a good front view from a vehicle on a rainy day.

As described above, the prior art air wiper has a doubled curtain formed of a first air curtain near to a windscreen glass and a second air curtain spaced away from the windscreen glass more than the first air curtain. However, when rain fall is heavy or a vehicle runs faster, the rain water blowing-off effect of the air curtain is not sufficient.

Moreover, since the strong wind streaming around the windscreen glass causes a large temperature difference between the outer side and the inner side of the windscreen glass, possible moisture condensation on the inner surface of the windscreen is produced. Particularly, the moisture condensation tends to occur more in cold seasons. There is another problem that since air from an oscillating air blast nozzle blows excessively and outward from both the sides of the windscreen glass, it may incidentally hit a person walking along a narrow street or passing by a parked vehicle.

SUMMARY OF THE INVENTION

In order to overcome the above mentioned various problems, an object of the present invention is to provide an air wiper mechanism for a vehicle that can provide an effective rain water blowing-off function.

Another object of the present invention is to provide an air wiper mechanism for a vehicle that can effectively prevent a windscreen glass from being blurred due to moisture condensation.

Still another object of the present invention is to provide an air wiper mechanism for a vehicle that can avoid compressed air directly spouted toward both sides of the vehicle.

In order to achieve the objects, an air wiper mechanism is characterized by compressed air supplying means arranged in a vehicle. A first air ejection unit having plural nozzles for spouting air fed from the compressed air supplying means upward along the outer surface of a windscreen glass forms a first air curtain at a position near the surface of the windscreen glass. The plural nozzles are positioned in front of and near the lower end of the windscreen glass and are arranged along the lower end of the windscreen glass at predetermined spaced intervals. A second air ejection unit having a nozzle for forming a second air curtain through an oscillating movement is also provided. The second air curtain is spaced away from the windscreen glass more than the first air curtain with the nozzle being arranged in front of and near to the lower end of the windscreen glass so as to spout upward air fed from the compressed air supplying means and being mounted so as to oscillate over the outer surface of the windscreen glass in a substantially parallel direction. Oscillating and driving means for oscillating the nozzle of the air ejection unit are provided the second air ejection unit includes plural nozzles divided into at least two nozzle parts. The nozzle parts are arranged respectively at different slope angles with respect to said windscreen glass so as to form at least two small air curtains spaced away from the windscreen glass. Warm air supplying means feeds warm air upward from a position in front of and near the lower end of the windscreen glass and along the outer surface of the windscreen glass.

The at least two nozzles of the second air ejection unit preferably include a center nozzle part having one or more nozzles arranged at a substantially center position of the windshield glass so as to form the first small curtain in the center region horizontally to the windscreen glass; and a side nozzle part formed of one or more nozzles arranged horizontally so as to form separately the second small curtains on the left side and right side of the windscreen glass. The nozzles of each of the nozzle parts have an oscillation angle at which blast air does not spout excessively and outward from the right and left sides of the windscreen glass.

The compressed air supplying means includes preferably a multiple-stroke compressor having plural cylinders; piston unit arranged so as to slidably reciprocate inside each of the cylinders; an exhaust vent for exhausting compressed air when the piston unit in each of the cylinders moves forward and an intake vent for opening only when the piston moves backward to introduce outside air; an exhaust tube arranged so as to communicate to the exhaust vent of each cylinder having internally an on-off valve for opening only at an exhaust operation time; and drive power transmission means for transmitting a rotational drive force obtained from a main power source of said vehicle as a reciprocative movement of each of the piston units so that at least one piston unit among all the piston units is always in a reciprocative state.

Furthermore, the air wiper mechanism for a vehicle has compressed air supplying means arranged in the vehicle and an air ejection nozzle unit for spouting compressed air upward from the compressed air supplying means at the position in front of and near the lower end of the windscreen glass. An ancillary windscreen glass is arranged at a predetermined interval from the windscreen glass so as to confront the entire inner or outer surface of the windscreen glass and warm air supplying means blows warm air into a gap between the ancillary windscreen glass and the windscreen glass.

According to the air wiper mechanism, the second curtain is formed of two or more small curtains that are respectively positioned at different distances from the windscreen glass.

The second air ejection unit forms at least two small curtains in addition to the first air curtain formed near and along the outer surface of a windscreen glass by the first air ejection unit, whereby an air curtain with at least three layers are formed as a whole.

The improved falling rain blowing-off effect can sufficiently avoid rain water even if rainfall is heavy and a vehicle runs at a higher speed.

Furthermore warm air, which is fed upward at the outer surface of the windscreen by the warm air supplying means, warms moderately the outer surface of the windscreen glass and prevents a temperature drop of the outer surface due to the air ejection, thus effectively preventing moisture condensation on the inner surface of a windscreen glass.

Particularly, according to the air wiper mechanism for a vehicle, the second air ejection unit is formed of two or more nozzle parts including a center nozzle part and right and left side nozzle parts to form a strong air curtain in the center area. Hence, the rain water blowing-off effect is improved largely. Since each of the nozzles is arranged so as to oscillate properly in such a manner that the ejected air is not excessively directed outward from the right and left sides of the windscreen glass, it can be effectively avoided to spout water directly at a person passing by a vehicle.

Since the compressed air supplying means is a multiple-stroke compressor which effectively uses a main power source for a vehicle as an air ejection power, it is not required to arrange an additional power source in the vehicle. In the drive force transmission means, at least one piston is in (but all could be in) a forward movement state at all times. For example, a 2-stroke compressor is adjusted in such a manner that when one piston group has completely finished the forward movement, the other piston groups have completely finished the backward movement to start the forward movement. As the number of the cylinders and the cycle number increase, it is possible to provide less air pressure pulsation when the compressed air is ejected.

According to the air wiper mechanism, the windscreen glass has an air-gap structure which includes an intermediate region inflated with warm air. Hence, since warm air rises on the outer side of the inner windscreen glass to a moderate temperature, moisture condensation does not occur on the inner surface thereof. On the other hand, since warm air flows directly on the inner surface of the outer windscreen glass, the moisture condensation is effectively prevented even if the temperature fall of the outer surface thereof occurs due to air ejection. Hence the moisture condensation which tends to occur due to the rain water blown off by the air ejection unit can be certainly prevented. Wide applications for the air wiper of this type can be easily found.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

With reference to the attached drawings, an explanation will be made of embodiments of the present invention.

Figure 1:
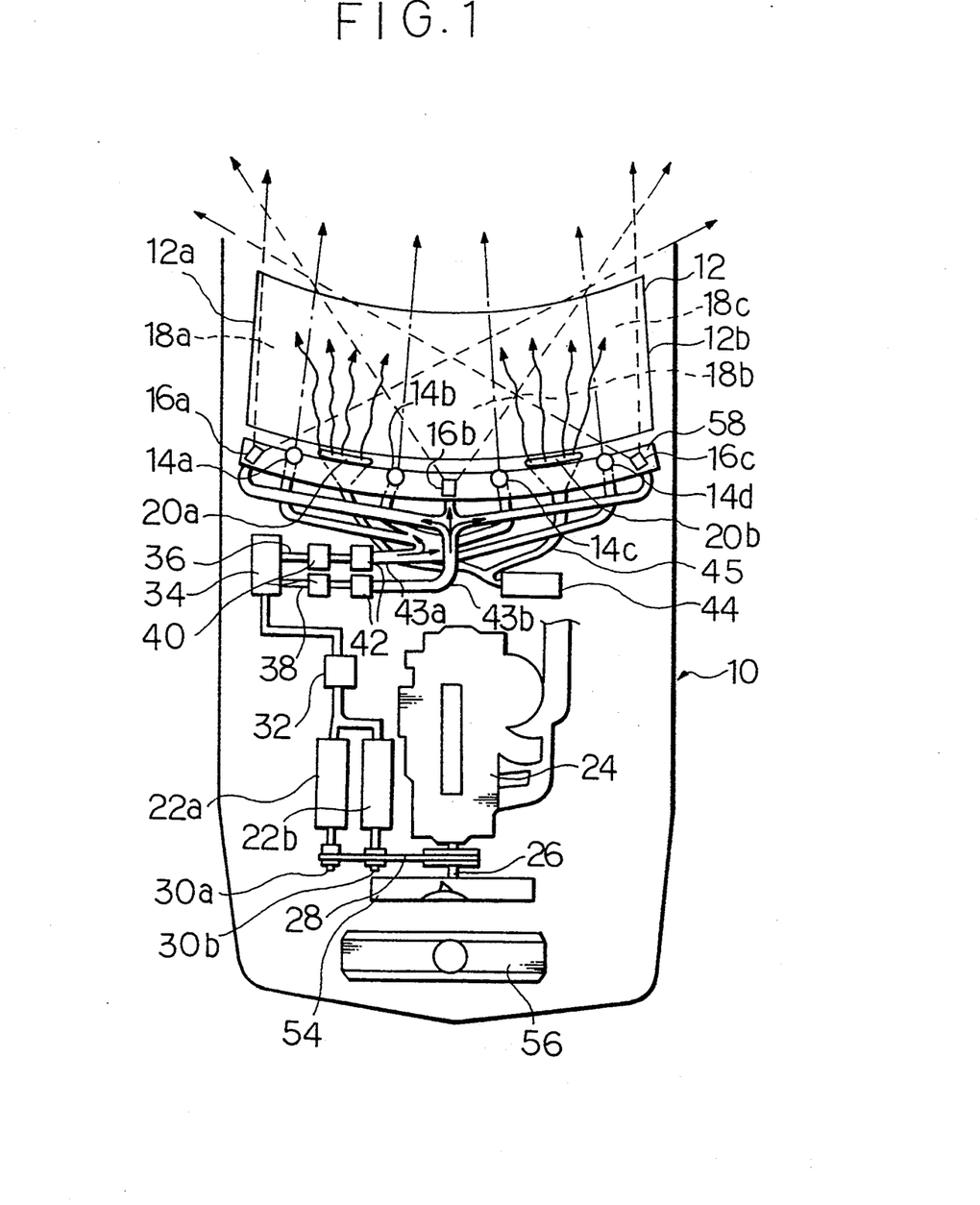
FIG. 1 is a schematic diagram of an air wiper mechanism for a vehicle according to an embodiment of the present invention.

FIG. 1 is an explanatory diagram showing the entire structure of an air wiper for a vehicle and the arrangement of each nozzle according to an embodiment of the present invention. FIG. 1 also shows schematically a part of the hood of a vehicle 10 and a part of a windscreen glass 12.

Each of the nozzles that form a first air curtain and a second air curtain is arranged near the lower end of the windscreen glass 12, or at a close position to the windscreen glass 12 upward from the hood. In the figure, for the convenience of explanation, four nozzles 14a to 14d constituting the first air ejection unit are represented with circles. The nozzles 14 are arranged in parallel so as to eject compressed air upward along the outer surface of the windscreen 12. That is, the first curtain is formed at the position near the outer surface of the windscreen 12.

Next, three nozzles 16a, 16b and 16c constituting the second air ejection unit are represented with a rectangular form, respectively. The nozzle 16b is horizontally arranged at a nearly center position of the windscreen 12. The nozzles 16a and 16c are respectively arranged near the right and left side ends of the windscreen glass 12. The nozzles 16a to 16c oscillate respectively so as to form small curtains 18a, 18b and 18c each being a small sector-like curtain as shown in Figure.

Each of the nozzles 14a to 14d, and 16a to 16c is mounted on the soundproof pipe 58. Each of the nozzles 14a to 14d for forming the first air curtain is fixed on the soundproof pipe 58 at equal intervals. Each of the nozzles 16a to 16c for forming the second air curtain is arranged at a predetermined position in the soundproof pipe 58 with the ejection vent exposed.

Figure 2:
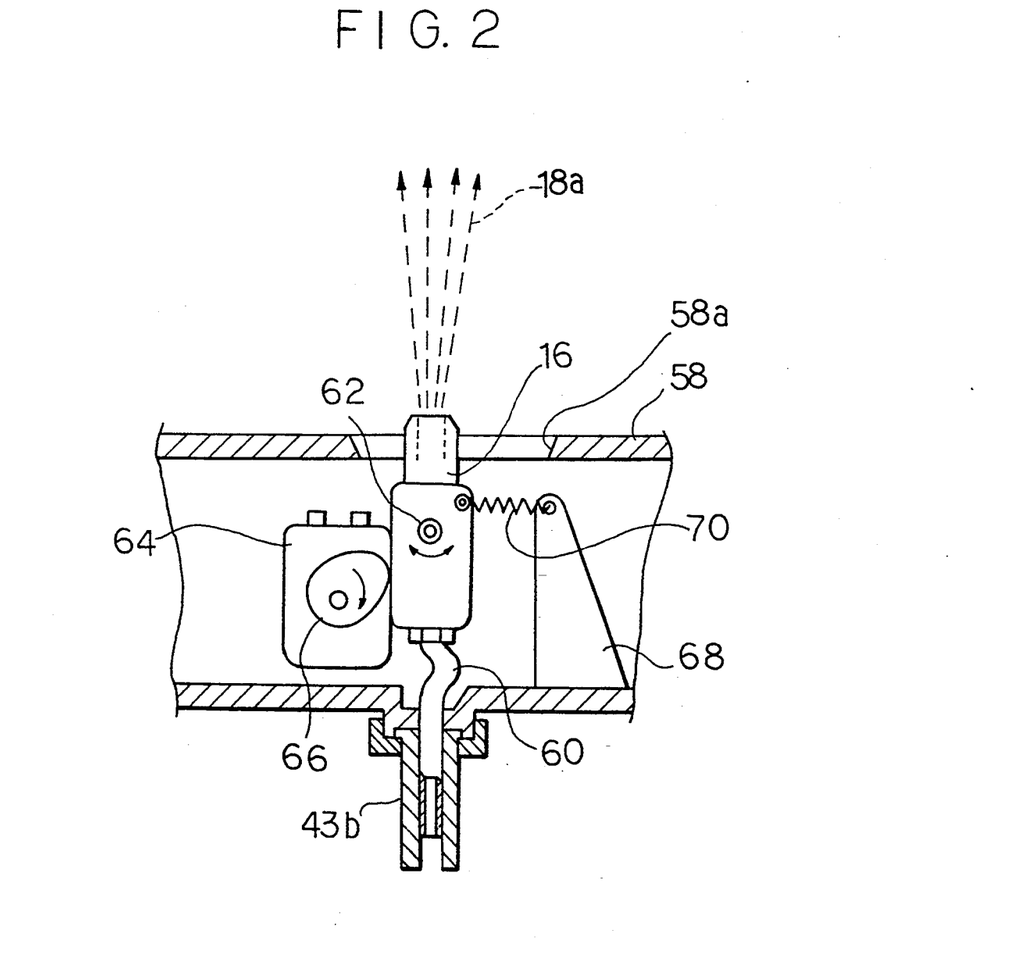
FIG. 2 is a schematic diagram showing the oscillating mechanism of the second air blast unit.

FIG. 2 shows an arrangement of each of the nozzles 16a to 16c within the soundproof pipe 58 and an example of the structure of a drive means for oscillating the nozzles. As shown in FIG. 2, the nozzle 16a has the nozzle tip protruded out of the opening 58a and is communicated to the pipe 43b for supplying compressed air via the flexible pipe 60. The nozzle 16a also is mounted rotatably around the center of the rotating shaft 62. A small motor 64 and a cam 66 rotated by a small motor 64 are arranged near the nozzle 16a. A cam of an egg-like shape is used as the cam 66 to oscillate the nozzle 16 over a suitable angle. A coil spring 70 is mounted between the lower position of the nozzle 16a and the spring stoppers 68 and biases the upper portion of the nozzle 16a so as to be in contact with the cam 66 at all times.

As shown in FIG. 1, each of the nozzles 16a, 16b and 16c is adjusted to an oscillating angle where the ejection air is not directly spouted outward from the right and left sides of the windscreen glass 12. The ejection air may blow out horizontally at the upper position of the windscreen glass, but it does not blast strongly and directly to a possible passer because the air ejection speed is fallen down around the area.

In the small curtains 18a, 18b and 18c forming the second air curtain, as shown in FIG. 1, the small curtains 18a and 18c are ejected substantially over a common plane and the center small curtain 18b is formed at a position separated further away from the windscreen glass 12 more than the two small curtains 18a and 18c. This is achieved by changing and arranging the slope angle of the nozzles 16a, 16b and 16c with respect to the surface of the windscreen glass 12.

Furthermore, one feature of the present invention is that warm air supplying means is arranged. In the first embodiment, warm air supplying vent 20a and 20b are arranged between the nozzles 14a and 14b and the nozzles 14a and 14b (refer to FIG. 1). Warm air is sent out of the warm air supplying vents 20a and 20b and goes up together with the air flow of the first air curtain. The warm air is supplied by operating a wind volume adjustable-type warm air generator 44 inside a vehicle.

Figure 3:
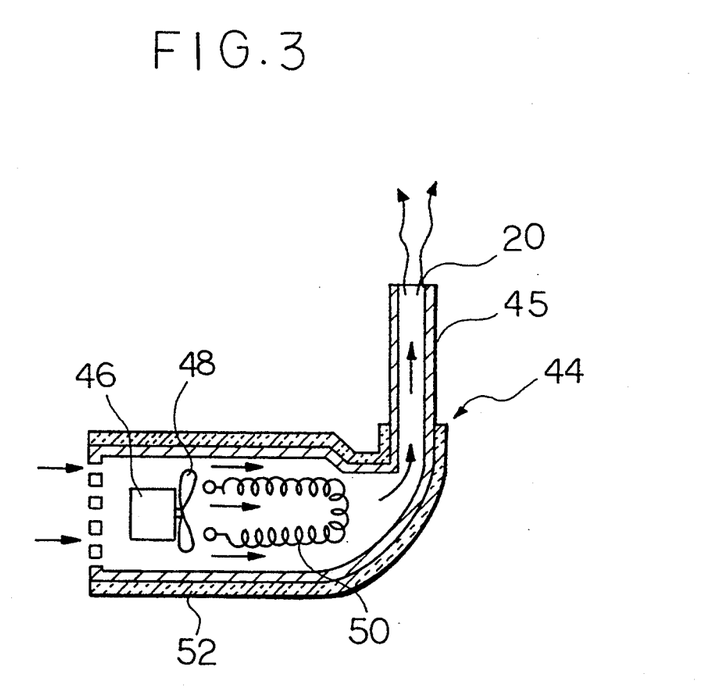
FIG. 3 is a schematic diagram, partly in cross section, showing an embodiment of warm air supplying means.

FIG. 3 shows a structural example of the warm air generator 44. The warm air generator 4 is simply constituted of a small motor 46, a small fan 48 fitted on the rotational shaft of the small fan 46, and an electric heater 50 arranged on the lower side of the warm air supplying vent 20a. A warm air conduit 45 is arranged to the warm air supplying vent 20a and 20b. The small motor 46 works with little electric power because warm air is carried with the air curtain flow at the supplying vents 20a and 20b. The warm air generator 44 is switched on in a vehicle to supply warm air. It is preferable that the warm air generator 44 is jacketed with a thermal insulating material 52 and arranged at a position nearer to the car compartment. In FIG. 1, numeral 56 represents a cooling fan and 56 represents a radiator.

Next, an explanation will be made for the structure of a compressed air supplying means for supplying compressed air to the nozzles 14 and 16, with reference to FIG. 1.

Two pumps 22a and 22b are arranged as a compressed air supplying source. The pumps 22a and 22b are driven by rotating the rotational shafts 30a and 30b thereof via the V-belt 28 worn around the rotational shaft 26 of the engine 24, to reciprocate the internal pistons thereof.

The air route to each of the nozzles 14 and 16 from the pumps 22a and 22b communicates with the shunt valve 34 via the pressure-control valve 32. Two pipes 36 and 38 are derived from the shunt valve 34. Meters 40 such as pressure gauge and flow meter are respectively equipped to the pipes 36 and 38. Moreover, needle valves 42 adjustable in a car compartment are respectively attached to the pipes 36 and 38. Finally the pipes 36 and 38 are respectively communicated with the nozzle 14 constituting the first air ejection unit and the nozzle valve 16 constituting the second air ejection unit via the pipes 43a and 43b.

Next, an explanation will be made below for the embodiment with respect to FIGS. 4 and 5.

Figure 4:
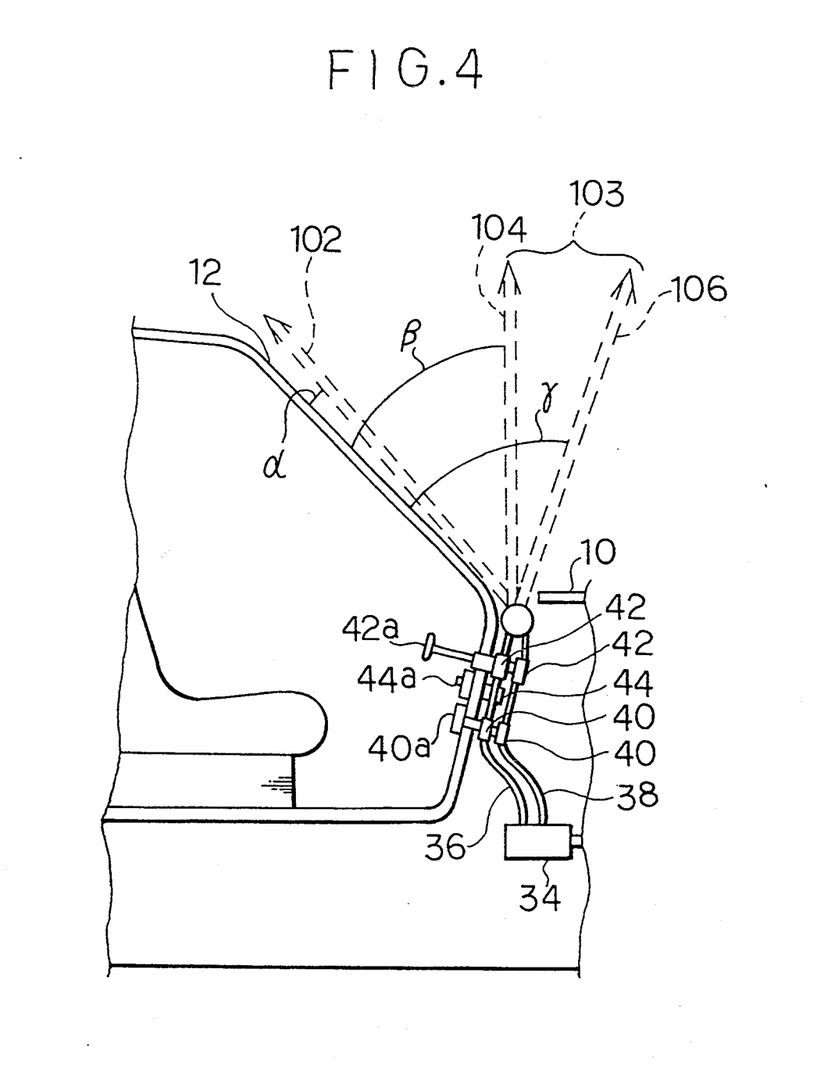
FIG. 4 is an explanatory diagram showing a mounted state of the major unit and air curtain forming positions according to an embodiment of the present invention.

FIG. 4 shows the nozzle mounting portion in the vehicle 100. In FIG. 4, the first and second air curtains are represented by broken lines. The first air curtain 102 is made near to the windscreen glass 12 and along the outer surface thereof. That is, the first air curtain 102 is formed upward by compressed air ejected from four nozzles 14a to 14d.

Next, the second air curtain 103 is formed of two small curtains 104 and 106 (18a, 18b and 18c in FIG. 1) at a different distance from the windscreen glass 12, respectively. In this case, the relation of degrees is $\alpha > \beta > \gamma$, where $\alpha$ is a degree of the first air curtain 102 with respect to the windscreen glass 12, $\beta$ is a degree of the small curtain 106, and $\gamma$ is a degree of the small curtain 106. In the present embodiment, the slope angles of the air ejection nozzles 16a and 16c are respectively adjusted so as to extend the small curtain 104 upward and substantially vertically with respect to the ground surface.

Figure 5:
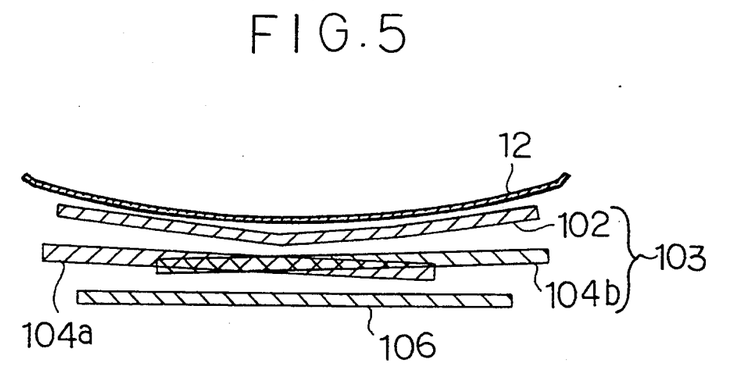
FIG. 5 is an explanatory diagram showing the arrangement of each curtain to a windscreen glass.

FIG. 5 shows the positional relations in tandem of the air curtains 102, 104 and 106. As shown in FIG. 5, the first air curtain 102 is formed at the position closest to the windscreen glass 12. One small curtain in the second air curtain 103 is formed of two further away small curtains (104a, 104b) formed in the nearly common plane by oscillating both the left air ejection nozzle 16a and the right air ejection nozzle 16c. The small air curtain 106 is formed by oscillating the air ejection nozzle 16b positioned on the outermost side.

Figure 6:
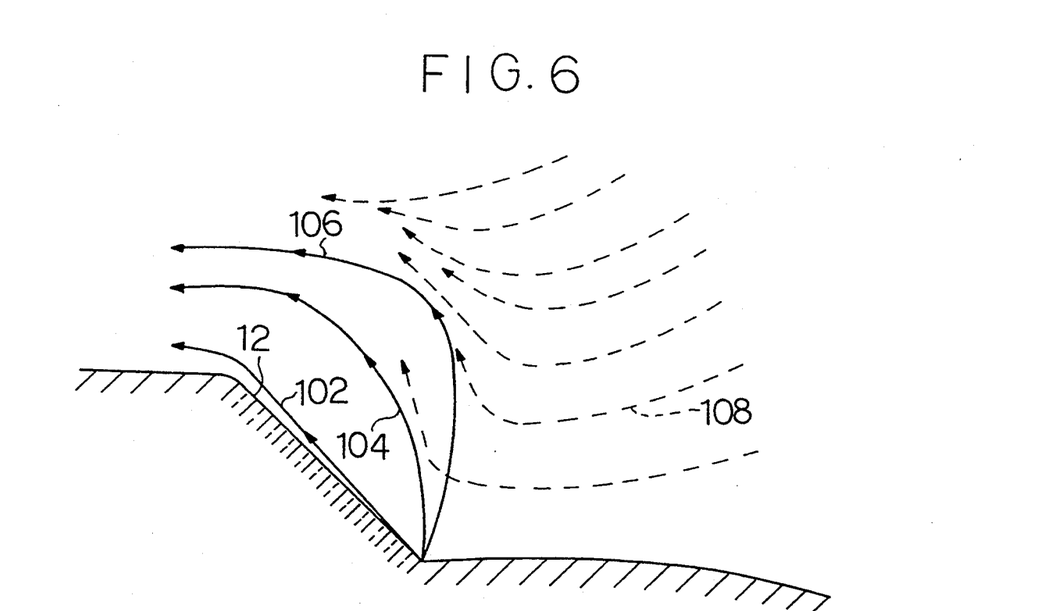
FIG. 6 is an explanatory diagram showing the action of an air curtain.

In such an air curtain forming condition, when a vehicle runs, the upper portion of each of the air curtains 102, 104 and 106, as shown in FIG. 6, is trailed backward due to the wind pressure and the front and upper portions of the windscreen glass 12 are completely covered with fast air flow. Since the air curtain is formed of three layers and has its middle portion where the air flow is particularly large, falling rain can be certainly shut off and blown out backward without reaching the windscreen glass 12.

Moreover, since the warm air supplying vents 20a and 20b supply warm air 108 at the position closest to the windscreen glass 12, it can prevent the temperature of the outer surface of the windscreen glass 12 from dropping largely, thus effectively preventing moisture condensation on the inner surface of the windscreen glass 12.

As shown in FIG. 4, since the display 40a of the meter 40 such as a pressure gauge and a flow meter is arranged in a vehicle, the compressed air ejecting information can be checked. Since the needle valve adjusting operation unit 42a on the compressed air supplying pipe are arranged in the vehicle, a driver can suitably adjust the amount of ejection air according to the amount of rainfall.

Furthermore, when a temperature drop due to the air ejection causes blurring of the windscreen 12, the operation unit 44a of the warm air generator 44 arranged in a vehicle can simplify the on-off operation of the warm air supply.

Figure 7:
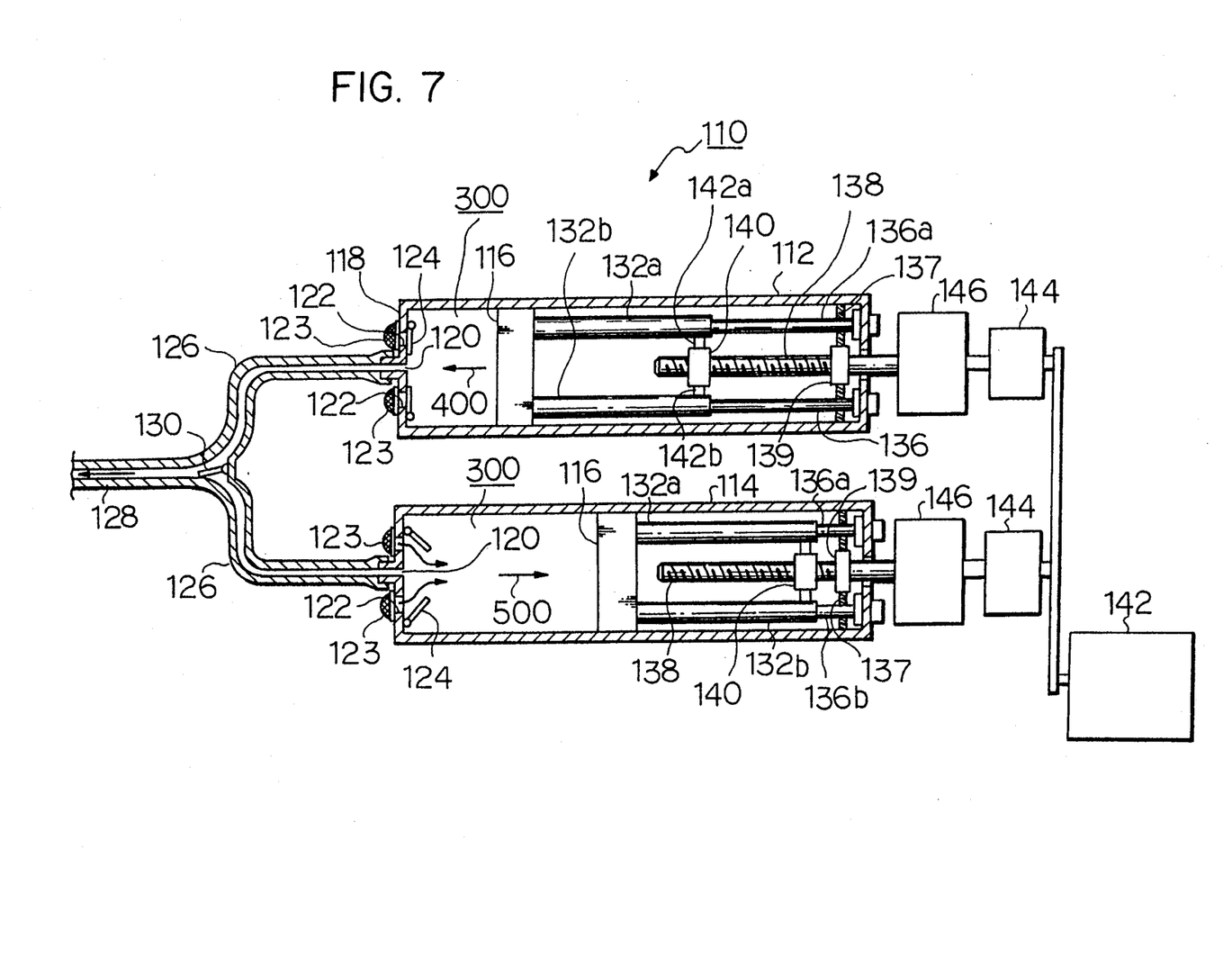
FIG. 7 is an explanatory diagram showing the structure of a two-stroke compressor according to an embodiment of compressed air supplying means.

Next, FIGS. 7 to 10 show a more detailed structural embodiment of the compressed air supplying means. The most simplified structure of the multiple-stroke compressor, shown in FIG. 7, is constituted of a 2-stroke compressor. The compressor 110 has two cylinders 112 and 114 (corresponding to the pumps 22a and 22b shown in FIG. 1). Each of the cylinders 112 and 114 includes a piston 116 that is arranged so as to move slidably therein.

An exhaust vent 120, where compressed air is exhausted because of the air compression function caused by the forward operation (in the direction of the arrow 400) of the piston 116, is formed in the base wall 118 of the air room 300 of each of the cylinders 112 and 114. Moreover, two intake vents 122, where outside air is introduced into the air room 300 as the piston 116 moves backward (in the direction of the arrow 500), are formed in the base wall 118. A rotary valve 124 is mounted so as to open the intake vent 122 only when the piston 116 moves backward. The valve 124 shuts the intake vent 122 when the piston 116 moves forward. A mesh filter 123 is mounted externally to the intake valve 122 to prevent dust from being drawn into the air room 300.

An exhaust tube 126 is mounted to the exhaust vent 120 to communicate with the air room 300. The two exhaust tubes 126 are combined on the downstream side of the air exhaust portion to form a bundled unit 128.

A rotary valve 130 is attached to the transition region between the two exhaust tubes and the bundled unit 128 so as to shut either of the exhaust tubes.

Next, an explanation will be made below as for the drive unit for reciprocating the piston 116.

Two supporting cylinders 132a and 132b are fixed on the rear surface of the piston 116 (on the opposite side to the air room 300) so as to extend in the reciprocating direction. The supports 136a and 136b are fixed to the other base portions 134 of the cylinders 136a and 136b so as to extend into the cylinders 112 and 113, respectively. The supports 136a and 136b are inserted so as to reciprocate into the support cylinders 132a and 132b, respectively.

A shaft 138 is arranged so as to penetrate substantially the center position of the cylinders 112 and 114 and to extend to a half position in the cylinder. The outer surface of the shaft 138 is threaded. The outer end of the cylinder of the shaft 138 is constituted so as to receive a drive force from the drive source. The mobile body 140 is screwed to the threaded portion of the shaft 138 with the inner side threaded. The mobile body 140 is fixed to the support cylinders 132a and 132b by the fixing arms 142a and 142b so as to hold its non-rotational state. Since the shaft 138 and the mobile body 140 have a pole treaded structure, respectively, it can be smoothly moved in the shaft extending direction by rotating the shaft 138. This allows the supports 132a and 132b and the pistons 116 fixed thereto to move.

The shaft 138 is securely fixed to the cylinder by means of the support 137 arranged in each cylinder and the bearing 139 arranged in the center portion thereof.

In the embodiment, a main power source 142 for a vehicle is used as a rotational drive source. A reduction gear box 144, which receives the rotational drive force transmitted from the main power source 142 and transmits the reduced rotational speed thereof, is arranged in the vehicle.

Furthermore, the clutch means 146 is switched by control means (not shown) to reverse the rotational direction transmitted by the reduction gear box 144 at intervals of a predetermined rotational number. The clutch means 146 is constituted so as to transmit the rotational operation to the shift 138. That is, the mobile body 140 is reciprocated by reversing the shaft 138 at intervals of a predetermined rotational number, thus producing the reciprocative movement of the piston 116.

In the present embodiment, the reciprocative movement of the piston 116 is adjusted in such as manner that either piston 116 always moves forward (in the direction of the arrow 400). In the case of the 2-stroke operation shown in the present embodiment, the main power source 142 executes the drive force transmission by setting the position of the mobile body 140 in such a manner that the piston 116 of the cylinder 114 is in a completely backward state when the piston 116 of the cylinder 112 is completely moved forward. Therefore, since the two pistons 116 and 116 moves always in complementary relation to each other, either one of the pistons moves always forward, whereby the compressed air can be supplied continuously.

For example, when the piston 116 in the cylinder 112 moves forward while the piston 116 in the cylinder 114 moves backward, compressed air is ejected from the exhaust vent 120 on the cylinder 112. The compressed air rotates the rotary valve 130 via the exhaust tube 126 and flows to the bundled unit 128 while the exhaust tube 126 on the cylinder 114, as shown in figure, is choked. On the other hand, since the rotary valve 124 at the intake vent 122 of the cylinder 114 is open, the piston moves backward while outside air is introduced into the air room 300.

As described above, according to the present embodiment, compressed air can be supplied as soon as the operation is started. An adjustment in operation of the piston 116 allows compressed air of 30 atmosphere pressure to spout from the bundled unit 128. Since the piston 116 is moved forward alternatively, a pulsation of the atmosphere pressure occurs but the compressed air can be supplied without being interrupted. The number of cylinders can be increased for 3-stroke operation or more that enables supplying uniformly compressed air.

Figure 8:
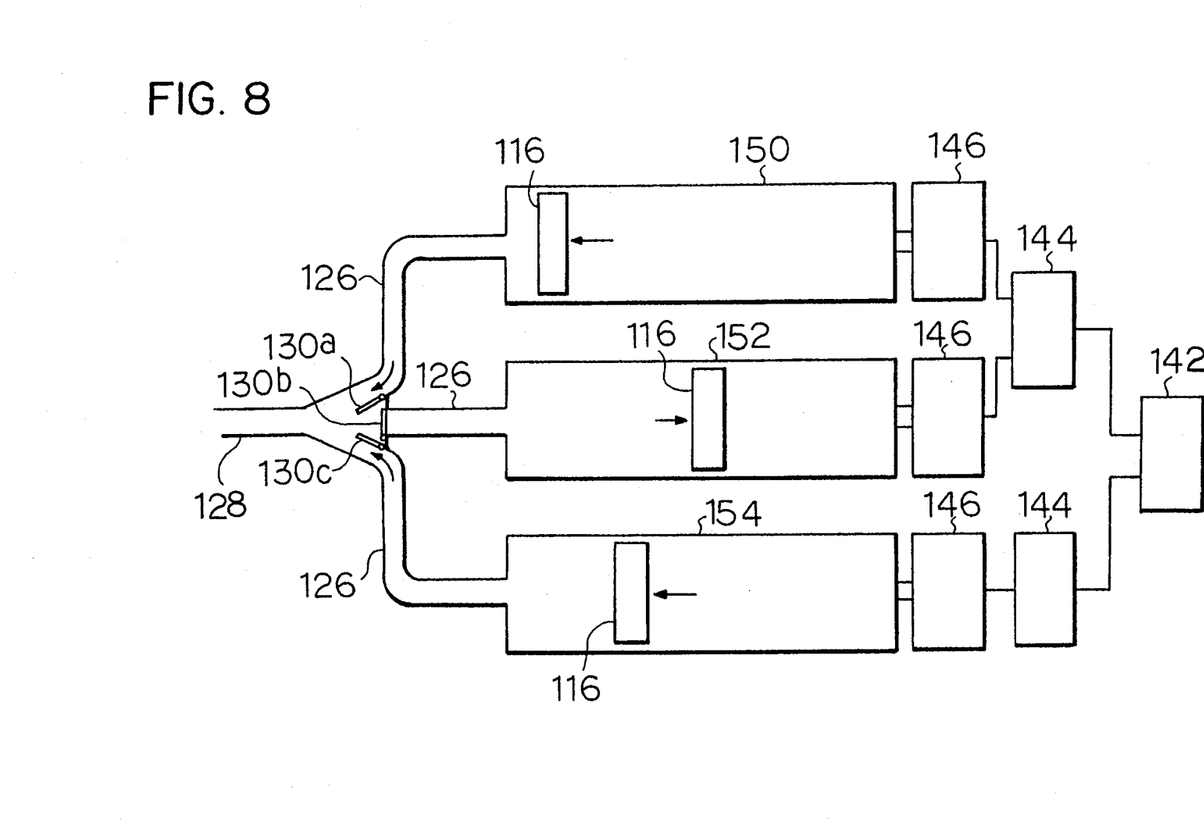
FIG. 8 is a schematic diagram showing the three-stroke compressor according to an embodiment of the compressed air supplying means.

FIG. 8 shows an example of a 3-stroke compressor. According to the present invention, three cylinders 150, 152 and 154 are arranged as shown in FIG. 8. Since the cylinders 150, 152 and 154 are in arrangement similar to those shown in FIG. 1, the illustration of them is omitted. Only the operational positions of the pistons 116 are illustrated.

In the present embodiment, rotary valves 130a, 130b and 130c are mounted on the transition portion between the three exhaust tubes 126 and the bundled unit 128, or the final portions of the exhaust tubes 126. The compressor is consisted so as to open only the rotary valve corresponding to the exhaust tube 126 which is spouting air by the exhaust pressure.

Moreover, in the present embodiment, the pistons 116 in three cylinders 150, 152 and 154 are operated by a single main power source 142, in a manner similar to that of shown in FIG. 1.

Each of the pistons 116 is adjusted so as to eject always compressed air from any one of the cylinders. That is, the pistons are adjusted in such a manner that when the piston 116 in the cylinder 150 is in a completely forward state, the piston 116 in the cylinder 152 is in a completely backward state while the piston 116 in the cylinder 154 is at a position corresponding to the half way position of both the above pistons. This adjustment allows compressed air to be supplied smoothly with less change in air pressure.

Figure 9:
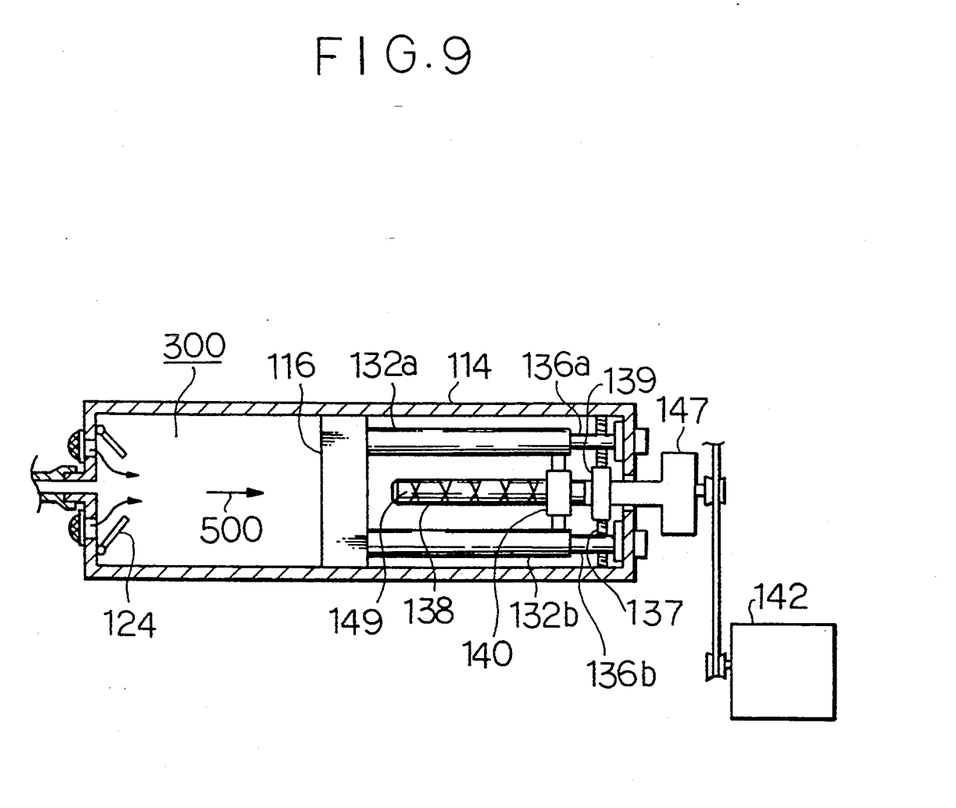
FIG. 9 is a cross-sectional schematic diagram showing an air compressed air supplying means with different shaft structure, according to another embodiment.

FIG. 9 shows another structure of the shaft 138 with the outer surface threaded. That is, as shown in FIG. 9, the shaft 138 has two lines of thread grooves being threaded so as to cross reversely to each other. The mobile body 140 moves along the groove of the reciprocating screw 149. Such a structure enables reciprocation of the mobile body 140 while the shaft 138 rotates always in one direction. Hence, it is not necessary to use the clutch mechanism for reversing the shaft shown in FIGS. 7 and 8 and the mechanism for performing a switching control of the clutch mechanism. That is, the rotational operation can be transmitted to the shaft 188 via the reduction gear means such as a jack gear 47 from the main power source 142.

Figure 10:
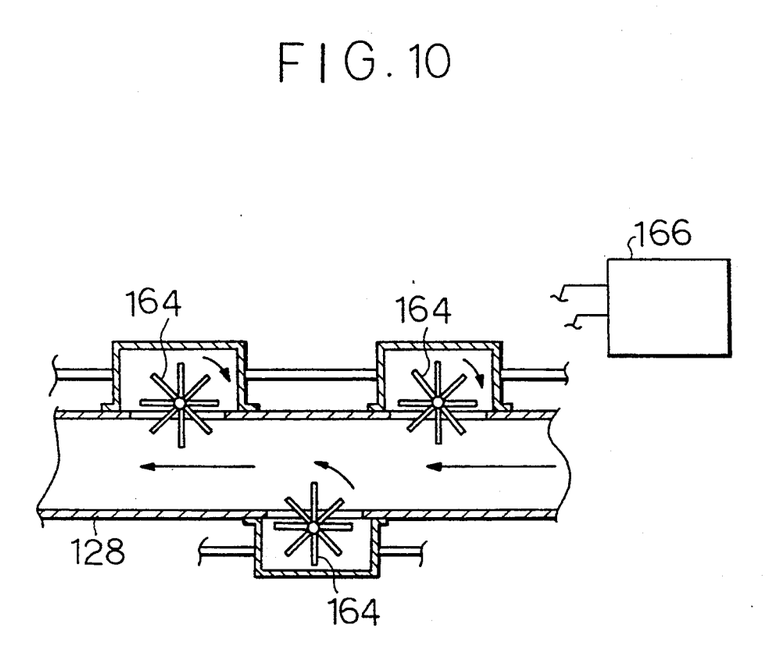
FIG. 10 is an explanatory diagram showing the structural embodiment of a dynamo equipped to the compressed air supplying means.

FIG. 10 shows an example in which a mechanism for generating simultaneously electric power using the air ejecting force of the compressor is added. As shown in FIG. 10, a generator of a turbine system is realized by arranging plural windmill-like small generators 164 in a part of the bundled unit 12a or pipe 43 shown in FIG. 1. Since the compressor can supply powerful compressed air, electric power produced by rotating the plural small generators 164 can be stored in the battery 166. Such a generator can function as an auxiliary power source for charging a battery for conventional vehicles and electric automobiles.

Figure 11:
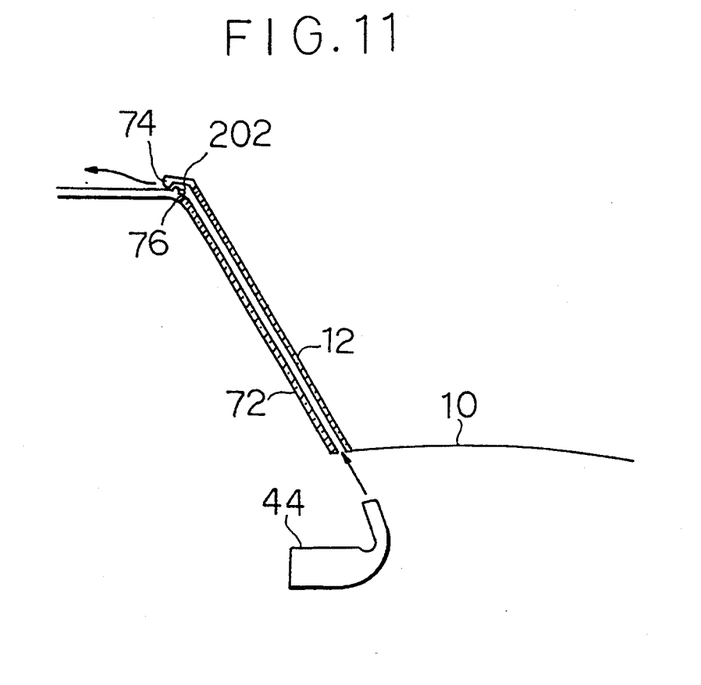
FIG. 11 is an explanatory diagram showing the structure of a warm air supplying mechanism for an air-gap type windscreen glass.

FIG. 11 shows another structural example of the warm air supplying mechanism. Since the air ejecting mechanism arranged in front of the windscreen glass 12 is similar to that shown in FIG. 1, the figure for it is omitted. In FIG. 11, an auxiliary windscreen glass 72 is additionally arranged inside of the windscreen glass 12, with a space 200 formed between the windscreen glass 12 and the auxiliary glass 72. Warm air from the warm air generator 44 is blown into the gap 200. That is, the above mentioned warm air supplying vents 20a and 20b are communicated to the gap 200.

A gap 202 is formed on the upper portion of the windscreen glass 12 so as to run away backward the inflated warm air. Small protrusions 74 and 76 are formed at the upper and lower portions to prevent rain water from flow reversely into the gap 202.

The above structure can provide a small drop in temperature of the auxiliary windscreen glass 72, thus certainly preventing moisture condensation on the inner surface thereof. Warm air flowing directly along the inner surface of the windscreen glass 12 can effectively prevent the moisture condensation.

Figure 12:
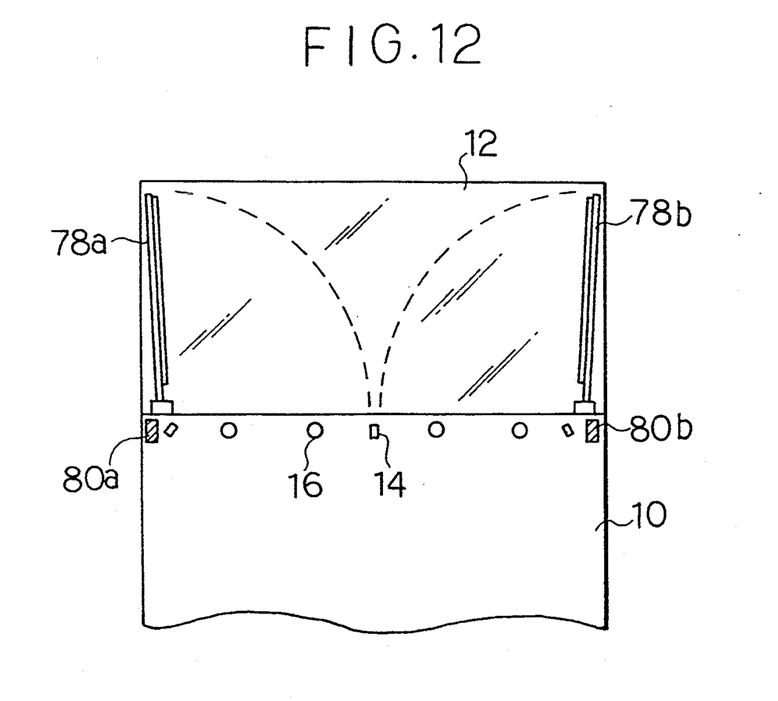
FIG. 12 is an explanatory diagram showing the connection arrangement of fitments and the air wiper mechanism according to the embodiment.

FIG. 12 shows an auxiliary member used to mount the air wiper mechanism of the above embodiment on a vehicle. Mechanical wipers 78a and 78b are attached on the left and right ends of the windscreen glass 12. The mechanical wipers are temporarily used when the air wiper is troubled by something. The mechanical wipers are normally positioned upright along the right and left sides of the windscreen glass 12 so as not to block wind from the air ejection nozzles 14 and 16 and the warm air supplying vent 20.

The infrared sensors 80a and 80b, for example, are mounted near the lower ends and the left and right sides of the windscreen glass 12. If a hand or face enters the air curtain area during the operation of the air wiper, the air wiper is stopped for safety.

It is apparent that the present invention should not be limited to only the structures according to the above embodiments and that various modifications are possible within the scope of the present invention. In the above embodiment, the second air curtain is formed of an air curtain of two layers arranged in tandem. However, the second air curtain, for example, may be formed of an air curtain of four layers over the center area of the windscreen glass by arranging a pair of the air ejection nozzles 16a and 16c at different planes.

As described above, according to the air wiper mechanism for a vehicle of the present invention, the first air curtain can blow away rain water closest to the windscreen glass. Moreover the second air curtain formed of two layers or more in front of the first air curtain can certainly prevent rain water from falling to the windscreen glass. Since compressed air does not blow outwardly from both the sides of the windscreen glass, spraying a nearby person can be prevented. Moreover, supplying warm air can prevent the temperature of the outer surface of the windscreen glass from dropping due to the air ejection, and therefore, moisture condensation on the windscreen glass can be effectively avoided. Therefore, there are many practical uses for the air wiper.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air wiper mechanism comprising:
   a first air ejection unit having plural nozzles for spouting air fed from said compressed air supplying means upward along the outer surface of a windscreen glass to form a first air curtain at a position near the surface of said windscreen glass, said plural nozzles being positioned in front of and near the lower end of said windscreen glass and being arranged along the lower end of said windscreen glass at predetermined spaced intervals;
   a second air ejection unit having a nozzle for forming a second air curtain through an oscillating movement, said second air curtain being spaced away from said windscreen glass more than said first air curtain, said nozzle being arranged in front of and near the lower end of said windscreen glass so as to spout upward air fed from said compressed air supplying means and the nozzle of the second air ejection unit being mounted to oscillate over the outer surface of said windscreen glass in a substantially parallel direction to a direction in which air is spouted from the first air ejection unit; and oscillating and driving means for performing said oscillation movement of the nozzle of the second air ejection unit;

said second air ejection unit including plural nozzles divided into at least two nozzle parts, said nozzle parts being arranged respectively at different slope angles with respect to said windscreen glass so as to form at least two small air curtains spaced away from said windscreen glass; and warm air supplying means for feeding warm air upward from a position in front of and near the lower end of said windscreen glass and along the outer surface of said windscreen glass.

2. The air wiper mechanism for a vehicle according to claim 1, wherein said at least two nozzle parts of said second air ejection unit include:

a center nozzle part having at least one nozzle arranged at a substantially center position of said windshield glass so as to form said first small curtain in the center region horizontally to said windscreen glass; and a side nozzle part formed of at least one nozzle arranged horizontally so as to form separately said second small curtains on a left side and right side of said windscreen glass;

the nozzles of each of said nozzle parts having an oscillation angle at which blast air does not spout excessively away from the right and left sides of said windscreen glass.

3. The air wiper mechanism for a vehicle according to claim 2, wherein said second air ejection unit has three nozzles, one nozzle thereof forming said center nozzle part, and left and right nozzles thereof forming said side nozzle part.

4. The air wiper mechanism for a vehicle according to claim 2, wherein a distance between the second small curtains and said windscreen glass is smaller than a distance between the first small curtain and said windscreen glass, whereby said first air curtain, said first small curtain and said second small curtains form a three layered air curtain as a whole.

5. The air wiper mechanism for a vehicle according to claim 1, wherein said first air ejection unit has four nozzles, said four nozzles being arranged at generally equal intervals.

6. The air wiper mechanism for a vehicle according to claim 1, wherein the compressed air supplying means has a compressed air supplying path to at least the nozzles of the first air ejection unit and the air wiper mechanism further comprising;

a throttle valve in the compressed air supplying path from said compressed air supplying means to each of said nozzles, said nozzles having said first and second air ejection units; and an operation unit for adjusting an opening angle of said throttle valve, the operation unit being positioned proximate to a driver's seat of said vehicle.

7. The air wiper mechanism for a vehicle according to claim 1, wherein said warm air supplying means includes a small fan arranged in said vehicle; a small heater arranged on the downstream side of wind from said small fan; and a warm air supplying conduit for conducting warm air heated by said small heater near to said windscreen glass and along said windscreen glass.

8. The air wiper mechanism for a vehicle according to claim 7, further comprising an operation unit provided proximate to a driver's seat, said small fan and said small heater in said warm air supplying means being adjusted by the operation unit.

9. The air wiper mechanism for a vehicle according to claim 1, wherein said compressed air supplying means comprises a multiple-stroke compressor including:

plural cylinders;

a piston unit arranged to slidably reciprocate inside each of said cylinders;

an exhaust vent for exhausting compressed air when said piston unit in each of said cylinders moves forward and an intake vent for opening only when said piston moves backward to introduce outside air;

an exhaust tube communicating with the exhaust vent of said each cylinder and having internally an on-off valve for opening only during an exhaust operation; and drive power transmission means for transmitting a rotational drive force obtained from a main power source of said vehicle as a reciprocative movement of each of said piston units so that at least one piston unit among all said piston units is always in a reciprocative state.

10. The air wiper mechanism for a vehicle according to claim 9, wherein said drive power transmission means comprises:

a reduction gear rotatable by a main power source of said vehicle;

a latch mechanism driven by the reduction gear;

a threaded shaft arranged extending axially in each of said cylinders, the shaft being reversible rotated at predetermined revolution intervals by the latch mechanism;

a mobile body screwed to said shaft for reciprocating along said shaft; and an arm unit coupled to said mobile body and said piston unit for reciprocating said piston unit together with reciprocation of said mobile body along the shaft.

11. An air wiper mechanism for a vehicle comprising:

compressed air supplying means arranged in a vehicle having a windscreen glass;

an air ejection nozzle unit for spouting compressed air upward from a compressed air supplying means at a position in front of and near a lower end of said windscreen glass;

an ancillary windscreen glass arranged at a predetermined interval from said windscreen glass so as to confront one of an entire inner and outer surface of said windscreen glass; and warm air supplying means for blowing warm air into a gap between said ancillary windscreen glass and said windscreen glass.

12. The air wiper mechanism for a vehicle according to claim 11, wherein said warm air supplying means includes:

a small fan arranged in said vehicle;

a small heater arranged on a downstream side of said small fan; and a warm air conduit communicated to a gap between said ancillary windscreen glass and said windscreen glass so as to conduct air heated by said small heater to a position near said windscreen glass.

* * * * *